United States Patent
Miyazaki et al.

[11] Patent Number: 6,163,079
[45] Date of Patent: *Dec. 19, 2000

[54] STRUCTURE OF ELECTRIC EQUIPMENT FOR VEHICLE

[75] Inventors: Yoshiyuki Miyazaki; Takashi Kobayashi, both of Nagoya, Japan

[73] Assignees: Harness System Technologies Research Ltd., Aichi; Sumitomo Wiring Systems, Ltd., Mie; Sumitomo Electric Industries, Ltd., Osaka, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/121,542

[22] Filed: Jul. 23, 1998

[30] Foreign Application Priority Data

Jul. 29, 1997 [JP] Japan .................................. 9-203446

[51] Int. Cl.[7] ..................................................... H05K 1/00
[52] U.S. Cl. ............................................. 307/10.1; 439/34
[58] Field of Search ............................. 439/34, 247, 248; 307/9.1, 10.1, 10; 361/641, 647, 643, 78.1, 35

[56] References Cited

U.S. PATENT DOCUMENTS

| | | | |
|---|---|---|---|
| 4,942,571 | 7/1990 | Moller et al. | 370/85.1 |
| 5,424,586 | 6/1995 | Hattori et al. | 307/10.1 |
| 5,610,454 | 3/1997 | Nishikava et al. | 307/147 |
| 5,625,350 | 4/1997 | Fukatsu et al. | 390/825 |
| 5,714,805 | 2/1998 | Lobaugh | 307/10.1 |
| 5,793,615 | 8/1998 | Bach et al. | 361/752 |
| 5,808,373 | 9/1998 | Namanishi et al. | 307/10.1 |

FOREIGN PATENT DOCUMENTS

| | | |
|---|---|---|
| 195 11 755 C1 | 8/1996 | Germany . |
| 195 26 809 A1 | 1/1997 | Germany . |
| 1-169998 | 10/1989 | Japan . |
| 8-2290 | 1/1996 | Japan . |

OTHER PUBLICATIONS

Japanese Laid Open Application, JP 09055262, Hiroyuki; Patent Abstracts of Japan, vol. 97.

*Primary Examiner*—Paula Bradley
*Assistant Examiner*—Alexander Gilman
*Attorney, Agent, or Firm*—Oliff & Berridge, P.L.C.

[57] ABSTRACT

The invention enables an electronic system, which is conveniently operated by a user, to be easily installed in a vehicle, such as an automobile, etc. A structure of electric equipment for a vehicle is provided, wherein vehicle-side connectors are disposed in a plurality of places in the vehicle. Constituent elements of an electronic system used in the vehicle are partly combined with a detachable connector capable of being connected to any one of the vehicle-side connectors to thereby form a detachable unit. Electronic system constituent elements in the detachable unit and electronic system constituent elements provided in the vehicle body are connected to each other to construct a new electronic system when the detachable connection is connected to any one of the vehicle-side connectors. As a result, a user's favorite detachable unit can be used in a user's favorite position.

19 Claims, 13 Drawing Sheets

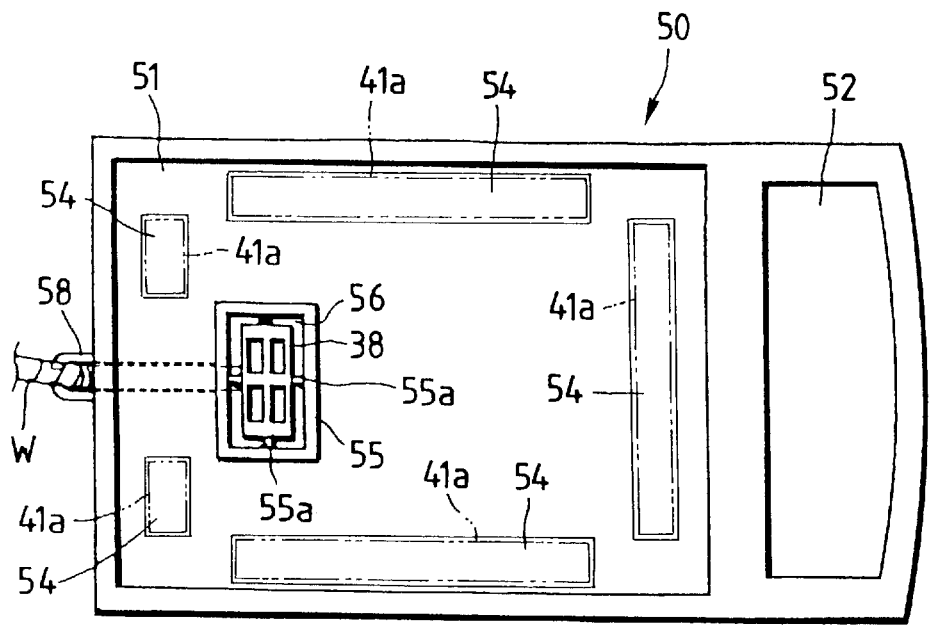
FIG.9
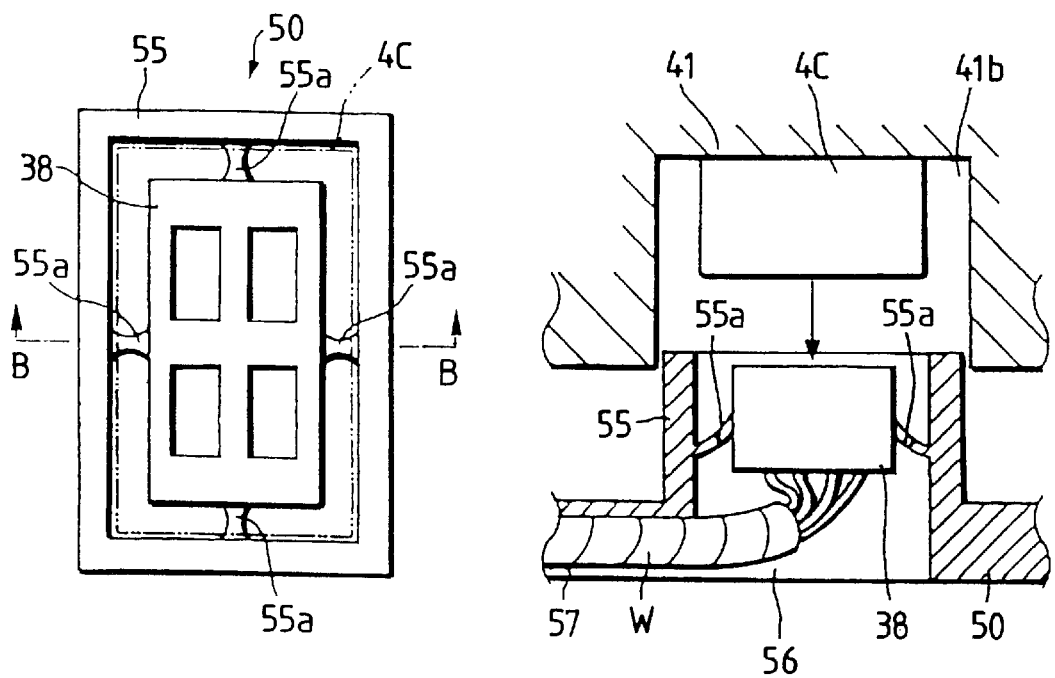
FIG.10(a)
FIG.10(b)

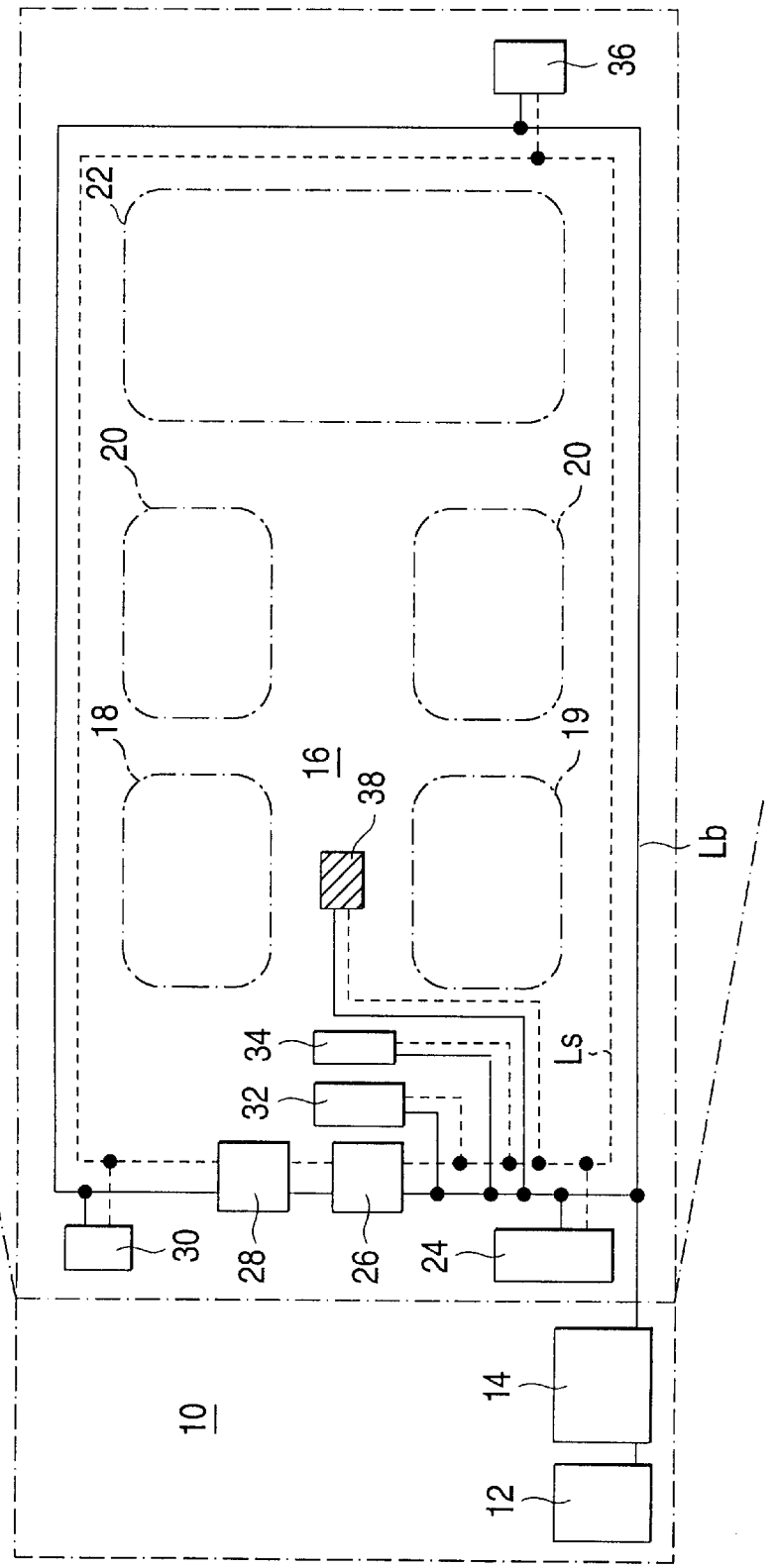

STRUCTURE OF ELECTRIC EQUIPMENT FOR VEHICLE

BACKGROUND OF THE INVENTION

1. Field of Invention

The invention relates to an electric equipment structure for constructing an electronic system such as an audio system, a car navigation system, etc. in a vehicle such as an automobile, etc.

2. Description of Related Art

Typically, in conventional vehicles, such as automobiles, almost all of the electric equipment parts used in the vehicles are installed in the body of each vehicle in advance in a fixed state.

In recent years, electric equipment parts used in vehicles, such as automobiles, have been diversified and must be installed in the vehicles efficiently. For example, electric equipment parts have been provided as optional parts so that a user can select only the truly necessary electric equipment parts to be installed in a vehicle. In most cases, the optional parts are installed in the vehicle in advance by the vehicle manufacturer before the user buys the vehicle. Thus, it is difficult for the user to provide additional optional parts in the vehicle by himself/herself as occasion demands after the purchase of the vehicle. Furthermore, the place where the electric equipment parts are installed is determined in advance, so that the user cannot mount the electric equipment parts in a desirable position freely.

SUMMARY OF THE INVENTION

It is therefore an object of the invention to provide an electric equipment structure for a vehicle in which a user's favorite electronic system can be installed by a simple operation in the vehicle, such as an automobile, and so that the electronic system can be operated easily.

In order to achieve this object, according to an aspect of the invention, a structure of electric equipment for a vehicle is provided, wherein vehicle-side connectors are disposed in a plurality of places in a vehicle. Constituent elements of an electronic system used in the vehicle are partly combined with a detachable connector capable of being connected to any one of the vehicle-side connectors to thereby form a detachable unit. Electronic system constituent elements of the detachable unit and electronic system constituent elements provided in the vehicle body are connected to each other to construct the electronic system when the detachable connector is connected to any one of the vehicle-side connectors.

In this structure, a detachable connector provided in a detachable unit is connected to any one of vehicle-side connectors so that a new electronic system can be constructed and can be used. Furthermore, because the vehicle-side connectors are disposed in a plurality of places in the vehicle, a vehicle-side connector disposed in a desired use position can be selected and the detachable connector can be connected to the selected vehicle-side connector so that electronic system constituent elements in the detachable unit can be used in the desired place.

The detachable unit may be provided singly. If various kinds of detachable units having different electronic system constituent elements are provided, the variety of electronic systems used in the vehicle is increased. In this case, the user selects a detachable unit having constituent elements of a user's favorite electronic system, and connects the detachable connector to the vehicle-side connector so that the user can use the electronic system. Accordingly, the types of electronic systems used in this vehicle can be increased while the number of electronic system constituent elements set in the vehicle body side can be minimized.

In the case where a signal is to be exchanged between electronic system constituent elements of the detachable unit and electronic system constituent elements provided in the vehicle body, a multiplex signal processing device is provided in the detachable unit so that multiplex communications can be made between the electronic system constituent elements in the detachable unit and the electronic system constituent elements in the vehicle body through the multiplex signal processing device. In this case, complex information exchange can be made by a simple wiring structure. Accordingly, the size of the detachable unit per se can be reduced and its structure can be simplified.

Electronic system constituent elements provided in the vehicle body and electronic system constituent elements of the detachable unit may be provided suitably in accordance with specifications, or the like. Further, these constituent elements contain a source of electricity such as a battery, or the like. For example, preferably, the electronic system constituent elements in the detachable unit are supplied with electric power from an electric source provided in the vehicle when the detachable connector is connected to any one of the vehicle-side connectors. In this case, it is not necessary to provide a source of electricity in the detachable unit.

Although the above-mentioned vehicle-side connector may be disposed singly in a cabin of the vehicle, the electronic system constituent elements in the detachable unit and the detachable connector may be installed in a unit housing, and a housing insertion portion may be provided in each of the places where the vehicle-side connectors are disposed in the vehicle so that the unit housing can be inserted into the housing insertion portion whereby the detachable connector and the vehicle-side connector are connected to each other by insertion of the unit housing into the housing insertion portion. In such a configuration, not only the operation of connecting the connectors to each other can be made easily, but also the detachable unit can be held in the cabin stably during connection of the connectors.

According to another aspect of the invention, a structure of electric equipment for a vehicle is provided, wherein a vehicle-side connector is disposed in a specific place in a vehicle. Constituent elements of an electronic system used in this vehicle are partly combined with detachable connectors capable of being connected to the vehicle-side connector to thereby form various types of detachable units having different electronic system constituent elements. Electronic system constituent elements of the detachable unit and electronic system constituent elements provided in the vehicle body are connected to each other to construct one of the electronic systems when the detachable connector in any one of the detachable units and the vehicle-side connector are connected to each other.

In this structure, a user can use a favorite electronic system by selecting a detachable unit having the user's favorite constituent elements of the electronic system, and connecting the detachable connector of the detachable unit to the vehicle-side connector. Accordingly, while the number of electronic system constituent elements provided in the vehicle body can be minimized, the types of electronic systems used in the vehicle can be increased.

Also in this structure, preferably, a multiplex signal processing device may be provided in the detachable unit so that the electronic system constituent elements of the detachable unit are multiplex-communicated with the electronic system constituent elements in the vehicle body through the multiplex signal processing device.

According to a further aspect of the invention, a detachable unit is provided which can be suitably used in the above electric equipment structures, and in which the detachable unit comprises a housing receiving therein: a detachable connector capable of being connected to a vehicle-side connector disposed in the vehicle; part of constituent elements of electronic systems used in the vehicle; and a multiplex signal processing device for performing multiplex communications between electronic system constituent elements of the detachable unit and electronic system constituent elements in the vehicle body when the detachable connector and the vehicle-side connector are connected to each other.

BRIEF DESCRIPTION OF THE DRAWINGS

FIG. 9 is a plan view of the console box.

FIG. 10(A) is a plan view showing a vehicle-side connector supporting structure in the console box; and FIG. 10(B) is a sectional view taken along the line B—B in FIG. 10(A).

FIG. 15 is a plan view showing an electric equipment structure for a vehicle in accordance with a second aspect for carrying out the invention.

DETAILED DESCRIPTION OF PREFERRED EMBODIMENTS

A first aspect for carrying out the invention will be described with reference to FIGS. 1 through 14. Although this aspect shows the case where the invention is applied to an RV (recreation vehicle), the invention may also be effectively applied to any vehicle regardless of the type of the vehicle, for example, to an ordinary passenger car.

Figure 1:
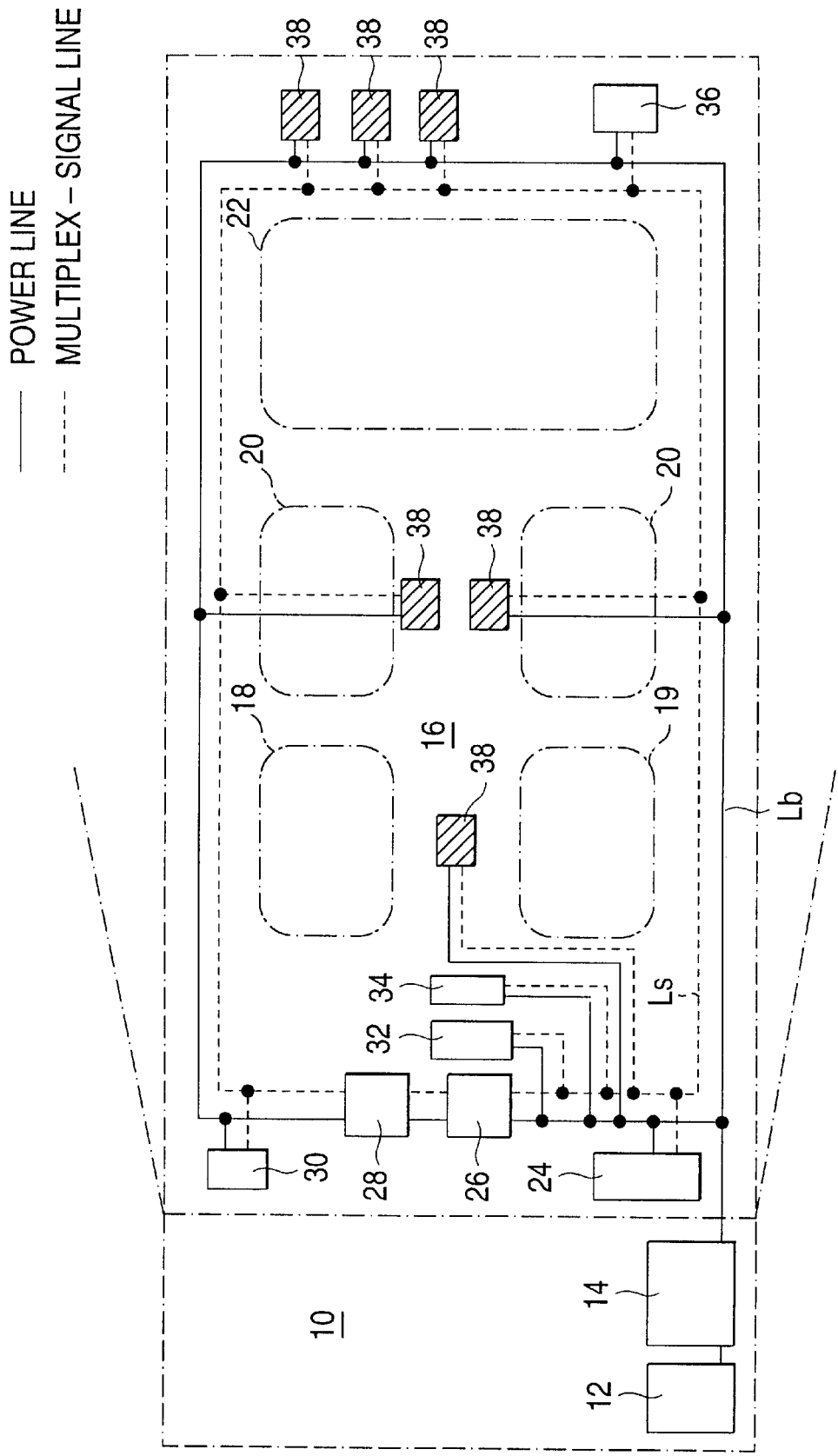
FIG. 1 is a plan view showing an electric equipment structure for a vehicle in accordance with a first aspect for carrying out the invention.

The RV shown in FIG. 1 has an engine room 10 in its front portion, and a cabin 16 in its rear portion. A battery 12 and a relay box 14, as parts of the vehicle electric equipment, are disposed in the engine room 10. A driver's seat 18, an assistant-driver's seat 19, center seats 20 and a rear seat 22 are disposed in the cabin 16. An air conditioner hardware unit 24, an air conditioner control unit 26, a car navigation control unit 28, an amplifier-provided speaker 30, an audio control unit 32 and an instrument-panel-side switch 34 (built in an instrument panel) are disposed, as parts of the vehicle electric equipment, in the front portion of the cabin 16. An antenna 36, as a part of the vehicle electric equipment, is provided in the rear portion of the cabin 16.

Figure 2:
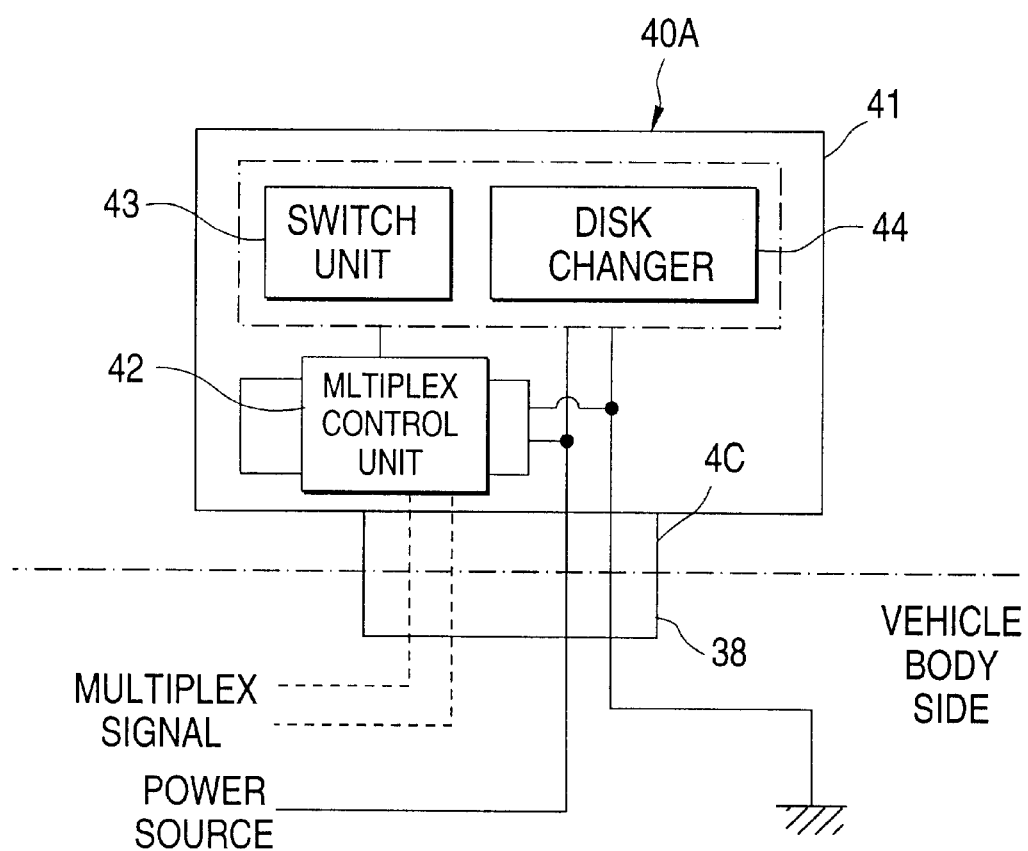
FIG. 2 is a block diagram showing the functional configuration of a detachment unit in the electric equipment structure.
Figure 3:
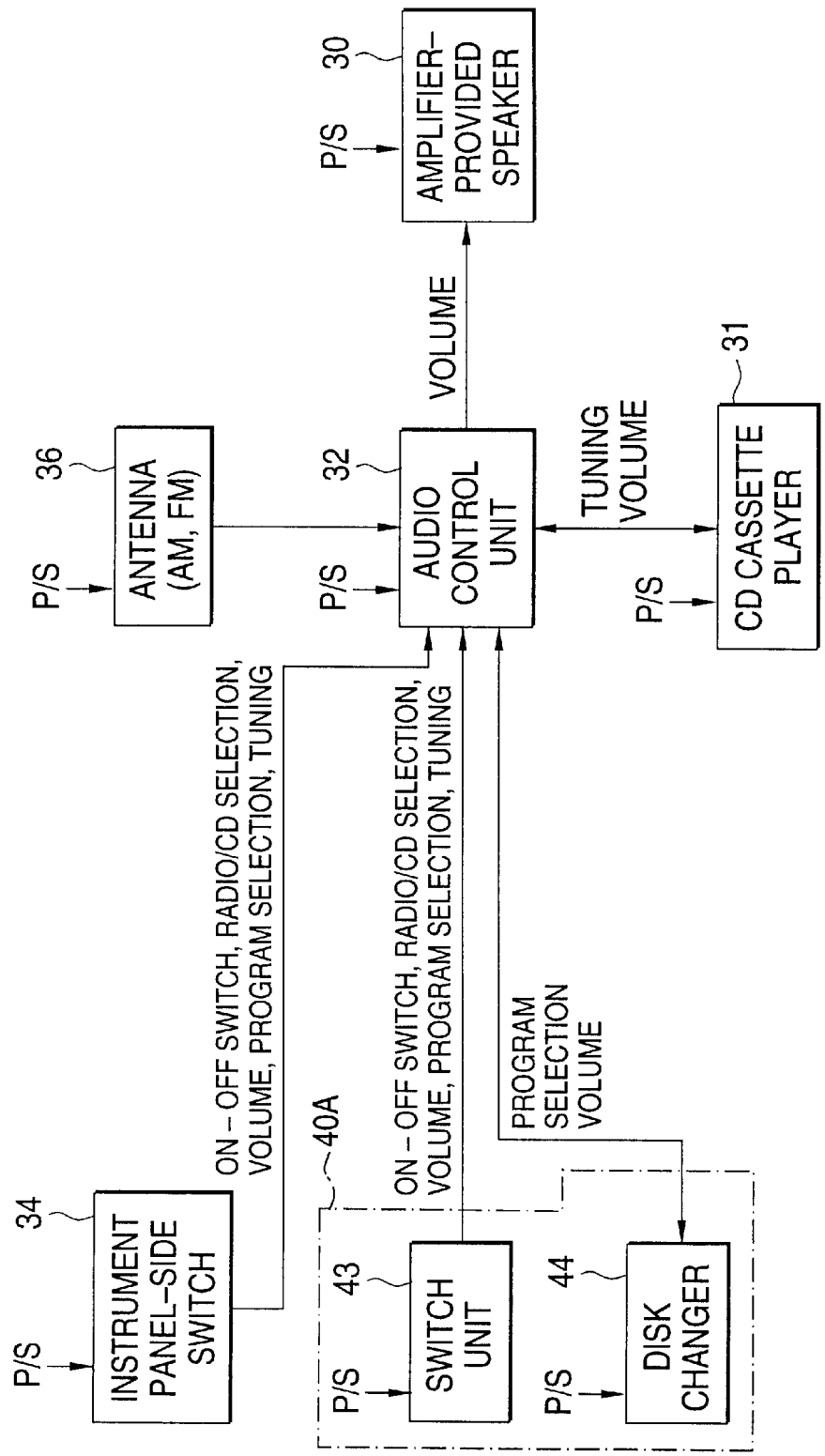
FIG. 3 is a block diagram showing an audio system installed in the vehicle.
Figure 4:
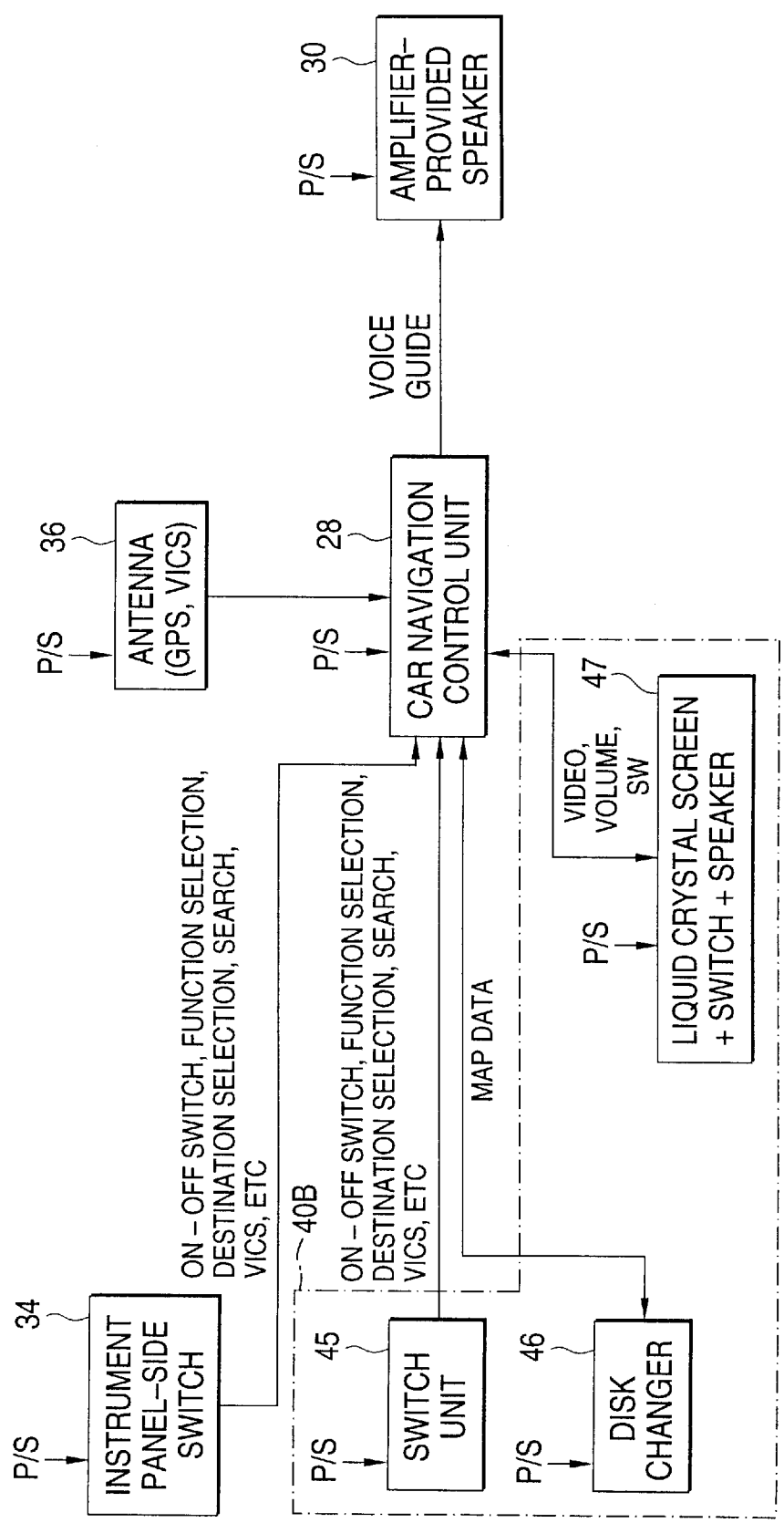
FIG. 4 is a block diagram showing a car navigation system installed in the vehicle.
Figure 5:
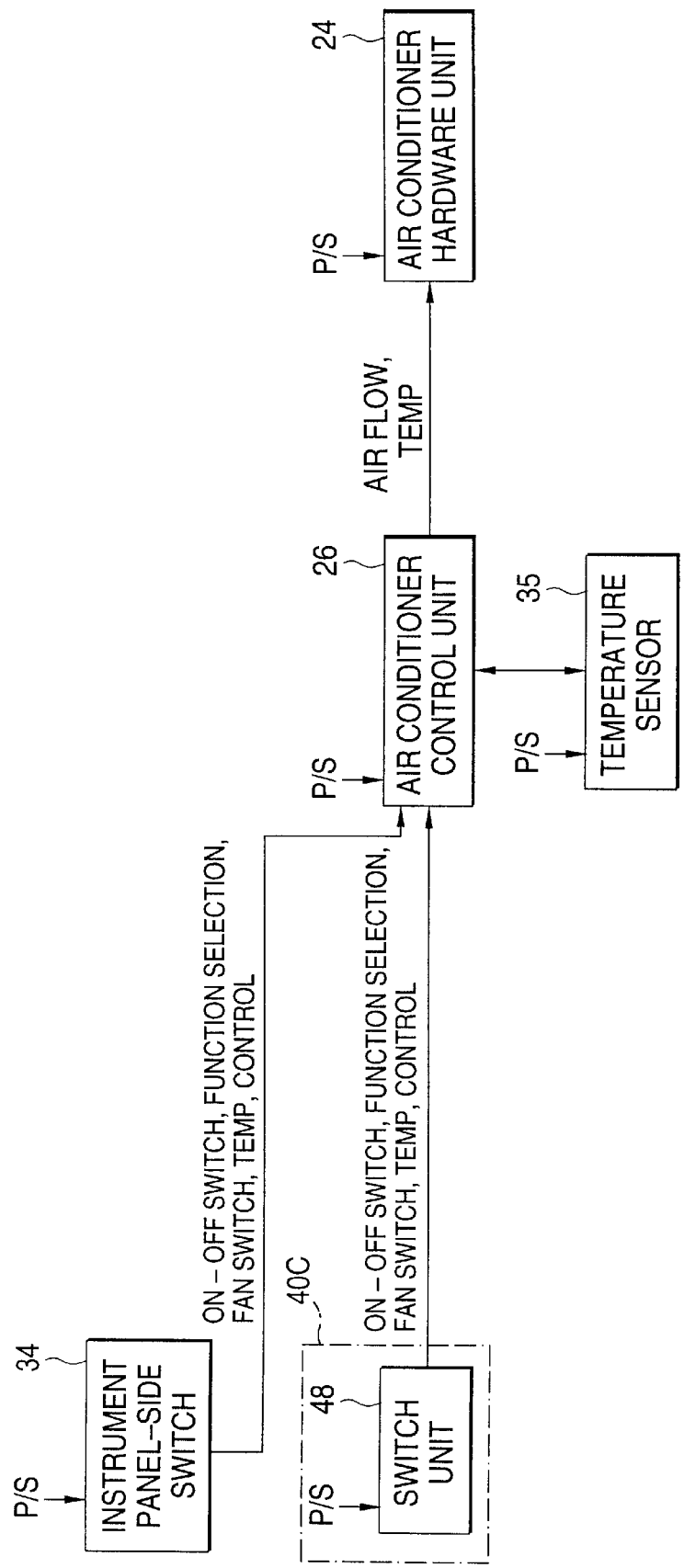
FIG. 5 is a block diagram showing an air conditioner system installed in the vehicle.

Further, in this vehicle shown in FIG. 1, vehicle-side connectors 38 are provided in a plurality of places in the cabin 16, that is, beside the driver's seat 18, beside the center seats 20 and behind the rear seat 22. These vehicle-side connectors 38 are connected to the aforementioned parts of the electric equipment through a power line Lb and a multiplex signal line Ls. On the other hand, various kinds of electric equipment units (an audio electric equipment unit 40A as shown in FIGS. 2 and 3, a car navigation electric equipment unit 40B as shown in FIG. 4 and an air conditioner electric equipment unit 40C as shown in FIG. 5 in this aspect of the invention) are prepared for this vehicle. The electric equipment units 40A, 40B and 40C may be designed so as to be connected to any one of vehicle-side connectors 38.

Specifically, a unit housing 41, a multiplex control unit 42 and a detachable connector 4C are received, as common constituent elements, in each of the electric equipment units 40A to 40C. The detachable connector 4C is designed so as to be connected to any one of the vehicle-side connectors 38. Other electric equipment parts are provided as follows. An audio switch unit 43 and a disk changer (CD/MD changer) 44 are received in the electric equipment unit 40A as shown in FIG. 3. A car navigation switch unit 45, a disk changer 46 and a liquid crystal screen/switch/speaker combination unit 47 are received in the electric equipment unit 40B as shown in FIG. 4. An air conditioner switch unit 48 is received in the electric equipment unit 40C as shown in FIG. 5.

When a detachable connector 4C is connected to a vehicle-side connector 38, as shown in FIG. 2, not only is a source of electricity from the battery 12 supplied to a multiplex control unit 42 and respective electric equipment parts (the switch unit 43 and the disk changer 44 in the detachable unit 40A shown in FIG. 2), but also these electric-equipment-unit-side electric equipment parts are multiplex-communicated with the vehicle-side electric equipment parts (the audio control unit 32, etc.) through the multiplex control unit 42. That is, a new electronic system is constructed by connecting the connectors 38 and 4C.

When, for example, the detachable connector 4C of the electric equipment unit 40A is connected to any one of the vehicle-side connectors 38 shown in FIG. 1, a new audio system as shown in FIG. 3 is constructed. In this system, when, for example, the audio switch unit 43 is operated, a multiplex signal containing instruction data (data concerning on/off changeover instruction, a radio/CD selection instruction, a volume control instruction, a program selection instruction, a station selection instruction, etc.) corresponding to the content of the operation and the address data concerning the partner address (address of the audio control unit 32) is outputted from the multiplex control unit 42 (not shown in FIG. 3). Upon receipt of the multiplex signal, the audio control unit 32 supplies a multiplex instruction signal to other electric equipment parts corresponding to the instruction data in the multiplex signal. For example, a multiplex signal containing address data for the amplifier-provided speaker 30 and a volume change instruction or a multiplex signal containing address data for the disk changer 44 in the electric equipment unit 40A and a program selection instruction is outputted.

When the detachable connector 4C of the detachable unit 40B is connected to any one of the vehicle-side connectors 38, a new audio system as shown in FIG. 4 is constructed. In this system, when, for example, the switch unit 45 is operated, a multiplex signal containing instruction data (data concerning an on/off changeover instruction, a function selection instruction, a destination setting instruction, a program search instruction, a VISC instruction, etc.) corresponding to the content of the operation and address data concerning the partner address (address of the car navigation control unit 28) is outputted from the multiplex control unit 42 (not shown in FIG. 4). Upon receipt of the multiplex signal, the car navigation control unit 28 supplies a multiplex instruction signal to other electric equipment parts corresponding to the instruction data in the multiplex signal. For example, a multiplex signal containing address data for the amplifier-provided speaker 30 and a voice guidance instruction or a multiplex signal containing address data for the disk changer 44 in the electric equipment unit 40B and a map data output instruction signal is outputted. Upon receipt of the multiplex signal, the disk changer 44 supplies a multiplex signal containing address data and map data for the car navigation control unit 28 through the multiplex control unit 42. Upon receipt of this signal, the car navigation control unit 28 supplies a multiplex signal containing address data and a map display instruction for the liquid crystal screen/switch/speaker combination unit 47.

When the detachable connector 4C of the detachable unit 40C is connected to any one of the vehicle-side connectors 38, a new air conditioner system as shown in FIG. 5 is constructed. In this system, when the switch unit 48 is operated, a multiplex signal containing instruction data (data concerning on/off changeover instruction, a function selection instruction, an air flow changeover instruction, a temperature control instruction, etc.) corresponding to the content of the operation and address data concerning the partner address (address of the air conditioner control unit 26) is outputted from the multiplex control unit 42 (not shown in FIG. 5). Upon receipt of the multiplex signal, the air conditioner control unit 26 supplies a multiplex instruction signal (a multiplex signal containing data concerning air flow and temperature, and address data concerning the air conditioner hardware unit 24) corresponding to the instruction data in the multiplex signal. Upon receipt of this signal, the air conditioner hardware unit 24 performs air flow control and temperature control corresponding to the instruction.

Accordingly, in this electric equipment structure, a user can form a favorite electronic system freely and easily by selecting any suitable detachable unit from various kinds of detachable units 40A to 40C and connecting the selected detachable unit to any one of the vehicle-side connectors 38 which is located in a position where the user can easily operate the corresponding electrical equipment. When, for example, the detachable connector 4C of the audio detachable unit 40A is connected to a vehicle-side connector 38 beside the center seat 20, a passenger sitting on the center seat 20 can perform an audio operation (such as on/off changeover, volume control, etc.) easily while sitting. Further, a plurality of detachable units (for example, three detachable units 40A to 40C) can be connected to different vehicle-side connectors 38 simultaneously. In this case, these detachable units can be used in different places simultaneously.

Incidentally, the type of detachable unit may be set suitably on the basis of the demand. One kind of detachable unit may be set or, alternatively, various kinds of detachable units may be set. An example of the latter alternative is shown in Table 1 as follows.

TABLE 1

| | System constituent elements | mount places | | kinds of system | | | | | | | |
| --- | --- | --- | --- | --- | --- | --- | --- | --- | --- | --- | --- |
| | | Vehicle | detachable unit | audio system | TV system | air conditioner | personal computer system | car navigation system | telephone system | Cold-storage box system | back monitor system |
| 1 | Electric source | ○ | | ○ | ○ | ○ | ○ | ○ | ○ | ○ | |
| 2 | SW unit | | ○ | ○ | ○ | ○ | | ○ | | | ○ |
| 3 | Instrument-panel-side SW | ○ | | ○ | ○ | ○ | | | | | ○ |
| 4 | Antenna | ○ | | ○ | ○ | | | ○ | | | |
| 5 | audio control unit | ○ | | ○ | | | | | | | |
| 6 | Amplifier-provided speaker | ○ | | ○ | ○ | | ○ | ○ | ○ | | |
| 7 | disk changer | | ○ | ○ | | | | ○ | | | |
| 8 | CD cassette player | ○ | | ○ | | | | | | | |
| 9 | TV antenna/TV control unit | | | ○ | ○ | | | | | | |
| 10 | liquid crystal screen/switch/speaker combination unit | | | ○ | ○ | | | ○ | | | |
| 11 | air conditioner control unit | ○ | | | | ○ | | | | | |
| 12 | air conditioner hardware unit | ○ | | | | ○ | | | | | |
| 13 | Navigation control unit | ○ | | | | | | ○ | | | |
| 14 | Personal computer body | | ○ | | | | ○ | | | | |
| 15 | Microphone | ○ | | | | | | | ○ | | |
| 16 | Camera | ○ | | | | | | | | | ○ |

TABLE 1-continued

|  | System constituent elements | mount places | | kinds of system | | | | | | | |
|---|---|---|---|---|---|---|---|---|---|---|---|
|  |  | Vehicle | detachable unit | audio system | TV system | air conditioner | personal computer system | car navigation system | telephone system | Cold-storage box system | back monitor system |
| 17 | Cradle | ○ |  |  |  |  |  |  | ○ |  |  |
| 18 | Refrigerator |  | ○ |  |  |  |  |  |  | ○ |  |

Table 1 shows an example in which the invention is applied to eight kinds of electronic systems, that is, an audio system, a TV system, an air conditioner system, a personal computer system, a car navigation system, a telephone system, a cold-storage box system, and a back monitor system.

According to this table, for example, the TV system is formed by seven constituent elements, that is, a source of electricity, a switch unit, an instrument-panel-side switch, an antenna, an amplifier-provided speaker, a TV-antenna-provided TV control unit and a liquid crystal screen/switch/speaker combination unit. Among these constituent elements, the source of electricity, the instrument-panel-side switch, the antenna and the amplifier-provided speaker are used as elements which have been installed in advance in the vehicle. On the other hand, the switch unit, the TV-antenna-provided TV control unit and the liquid crystal screen/switch/speaker combination unit are received in the detachable unit of the TV system.

Further, in the detachable unit for the cold-storage box system, a cold-storage space is formed in the housing of the detachable unit and provided with a refrigerator simply. With respect to the detachable unit, only power supply from the vehicle body side to the refrigerator is effected. Accordingly, it is unnecessary to provide a multiplex control unit in the detachable unit of this system. In the case where only a detachable unit without multiplex control unit is prepared as described above, the connection of the multiplex signal line Ls to the vehicle-side connector 38 becomes unnecessary, that is, only the power line Lb may be connected to the vehicle-side connector 38.

In the invention, the decision as to whether a certain system constituent element is set in the vehicle body side or in the detachable unit may be made freely and is not limited by the content of this table. For example, another source of electricity (for example, a battery) other than the vehicle-side battery may be provided in the detachable unit and, alternatively, the disk changer may be set in the vehicle body. When a source of electricity is provided in the detachable unit, the connection of the power line Lb to the vehicle-side connector becomes unnecessary.

The aforementioned vehicle-side connector 38 may be singly disposed in the vehicle. If a unit attachment portion is provided in the vehicle body and a vehicle-side connector is arranged so that the vehicle-side connector can be connected to the detachable connector of the detachable unit when the unit housing of the detachable unit is attached to the unit equipment portion, not only can the connectors be connected to each other easily, but also the attachment of the detachable unit can be stabilized.

Figure 6:
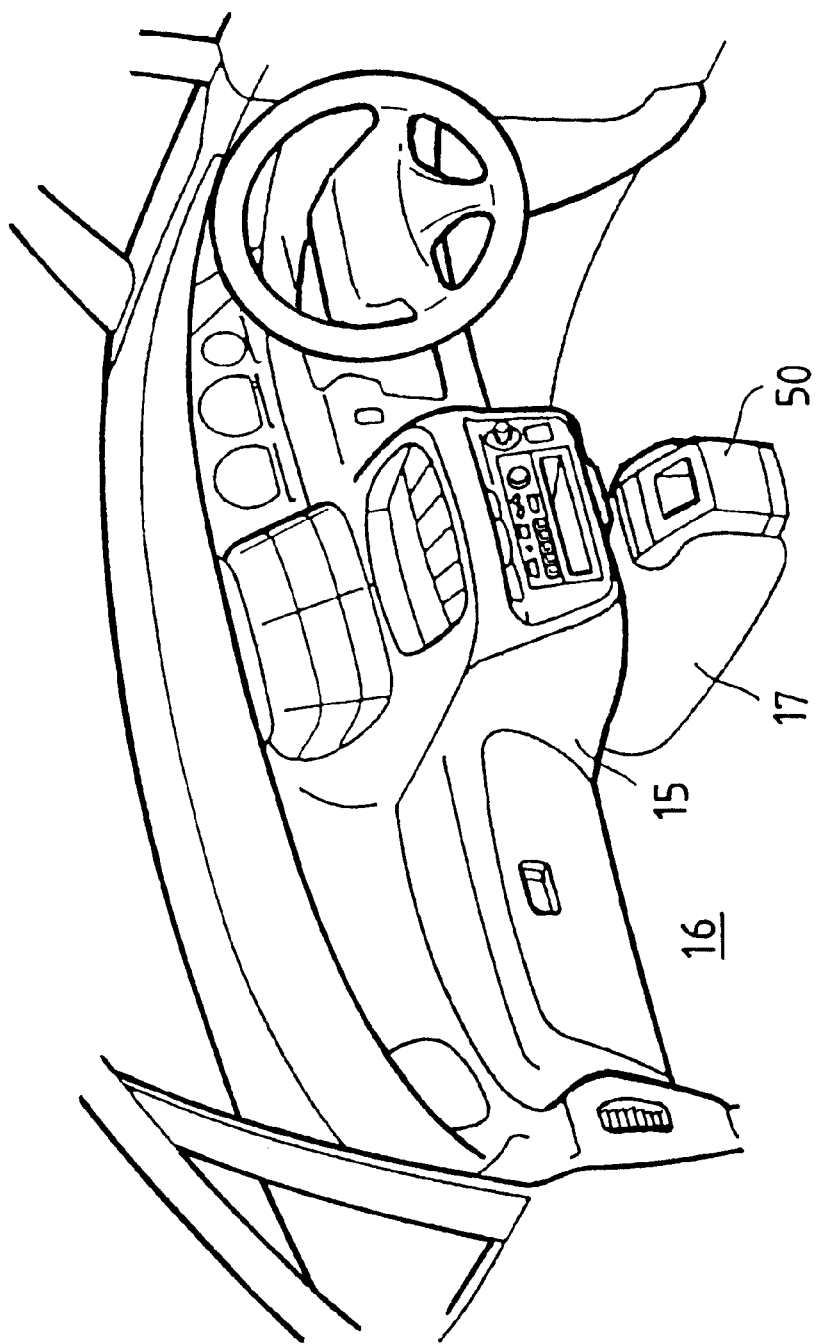
FIG. 6 is a perspective view showing an instrument panel in the vehicle and a console box provided under the instrument panel.

Preferred examples of the structure thereof are shown in FIGS. 6 to 14. Here, the vehicle-side connector 38 (the leftmost connector in FIG. 1) beside the driver's seat 18 in FIG. 1 is attached to a console box (unit insertion member) 50 as shown in FIG. 6. The console box 50 is designed so as to be movable back and forth between the position of use shown in FIG. 1 and the housing position in which the console box 50 is pushed under the instrument panel 15 as shown in FIG. 6.

Figure 7:
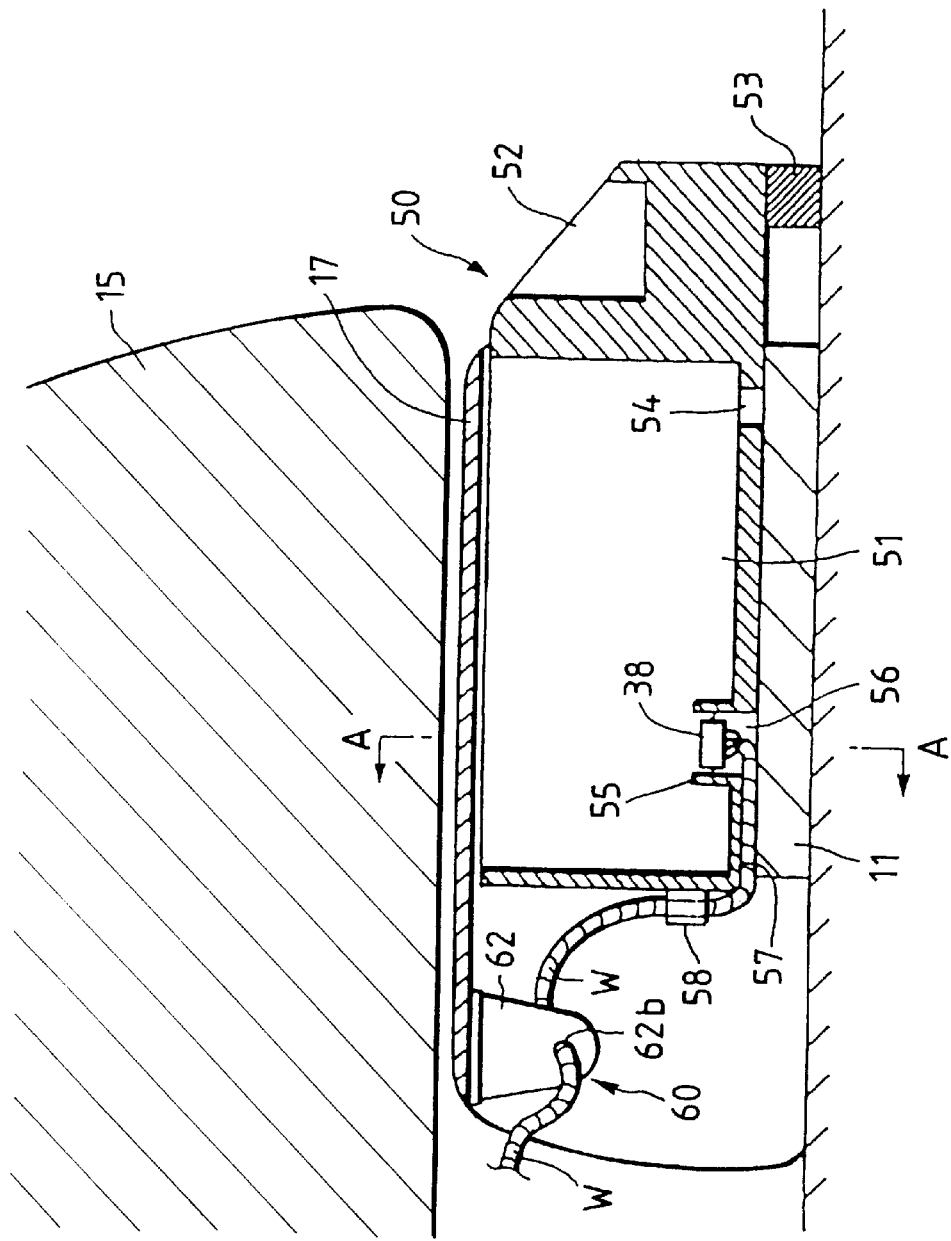
FIG. 7 is a sectional side view showing the console box in a housing position.
Figure 8:
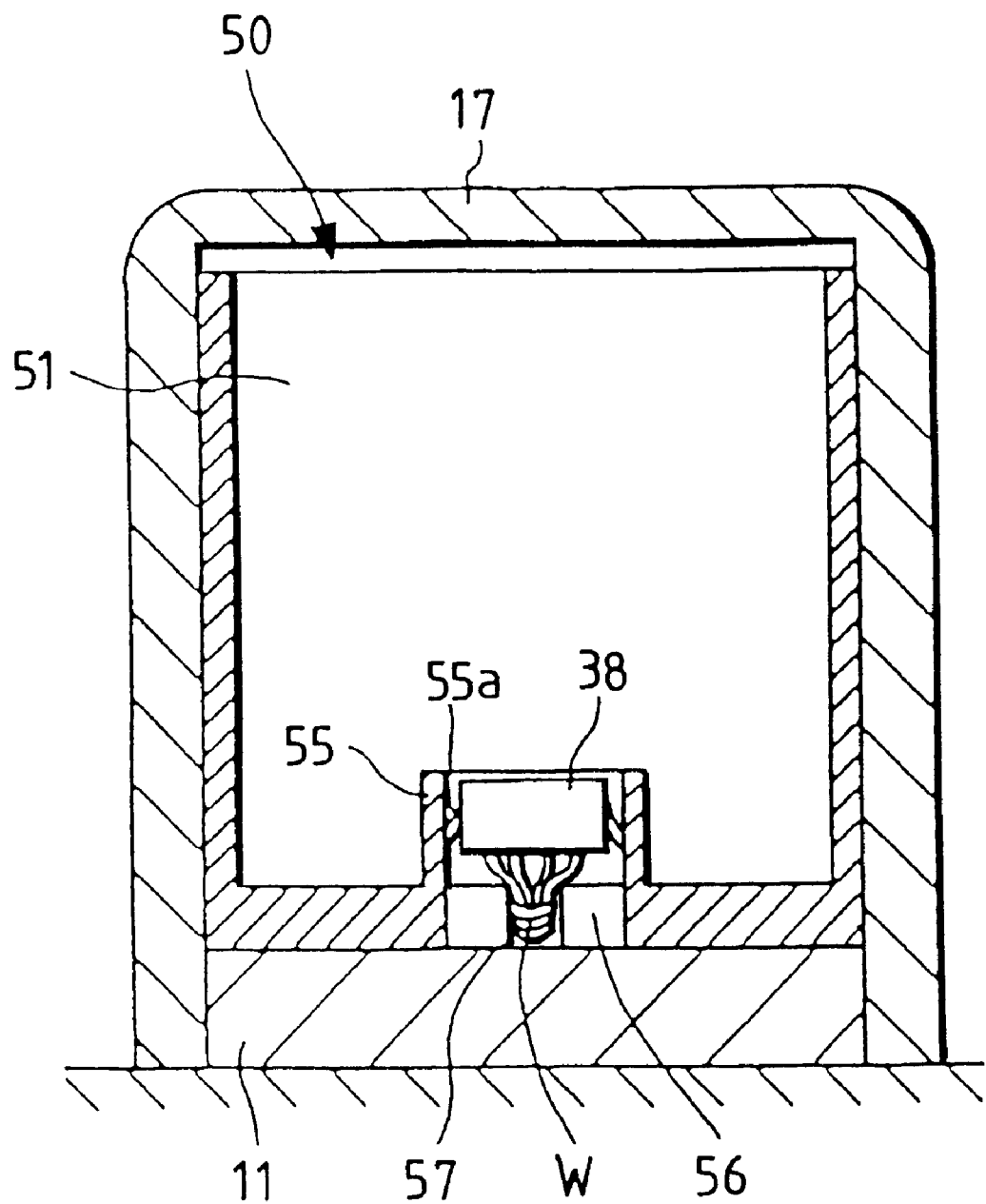
FIG. 8 is a sectional view taken along the line A—A in FIG. 7.

As shown in FIGS. 6 and 7, a box cover 17 which opens toward the rear of the vehicle (the right in FIG. 7) is set under the center portion of the instrument panel 15 so that a step portion 11, higher by one step, is formed on a floor covered with the box cover 17. Further, the console box 50 is inserted in the space in the box cover 17 on the step portion 11 from the rear of the vehicle.

Figure 14:
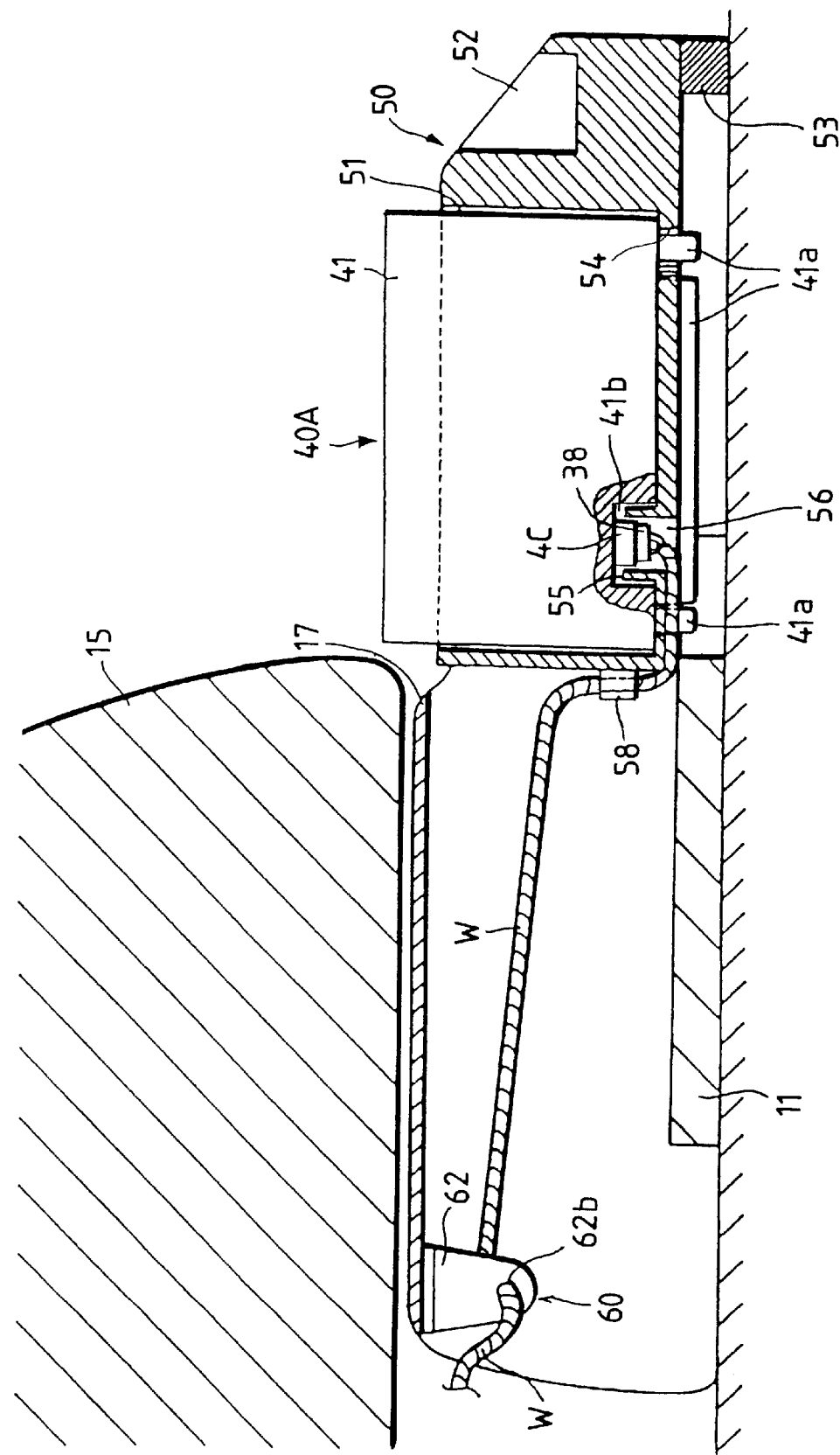
FIG. 14 is a sectional side view showing the console box in a use position.

A unit insertion space 51, which opens upward, is formed in the console box 50. A knob cavity portion 52, which opens upward like the unit insertion space 51 so that a finger can be inserted into the cavity portion 52, is formed at a position immediately in front of the unit insertion space 51. A support block 53 is fixed to the lower surface of the front end portion of the console box 50 so that the lower surface is supported in position level with the upper surface of the step portion 11. Because the console box 50 is inserted in, or removed from, the box cover 17, the position of the console box 50 can be changed between the housing position in which the unit insertion space 51 is covered with the box cover 17 from above as shown in FIGS. 6 and 7, and the use position in which the unit insertion space 51 is drawn toward the side of the driver's seat so as to be opened upward as shown in FIG. 14.

As shown in FIG. 9, through-holes 54, extending along the circumferential edge portion of the bottom wall of the unit insertion space 51, and a connector support frame 55 are formed in the bottom wall of the unit insertion space 51. The inner space of the connector support frame 55 serves as a through-hole 56 penetrating the box bottom wall vertically. A U-groove 57, which is opened downward, is formed in a region from the lower end of the through-hole 56 to the box rear end. Further, the vehicle-side connector 38 is provided in the upper portion of the through-hole 56. The vehicle-side connector 38 is integrally connected to the connector support frame 55 through thin connection pieces 55a as shown in FIG. 10(A) so that the vehicle-side connector can be displaced horizontally finely relative to the connector support frame 55.

On the other hand, the unit housing 41 for each of the electric equipment units 40A to 40C has a shape in which the unit housing 41 can be inserted in the unit insertion space 51 from above. Projecting strips 41a (FIG. 14) are provided in the bottom surface of the unit housing 41 so as to be projected downward so that the projecting strips 41a can be inserted in the through-holes 54 from above. A U-portion 41b as shown in FIG. 10(B) is formed in the bottom wall of the unit housing 41 so that a detachable connector 4C is provided in the U-portion 41b. Further, when the electric equipment unit 40A (40B or 40C) is inserted in the unit insertion space 51 so that the projecting strips 41*a* are inserted in the through-holes 54, the connector support frame 55 is fitted into the U-portion 41*b* and the detachable connector 4C is fitted into the connector support frame 55 so that the detachable connector 4C and the vehicle-side connector 38 are connected to each other automatically.

Figure 11:
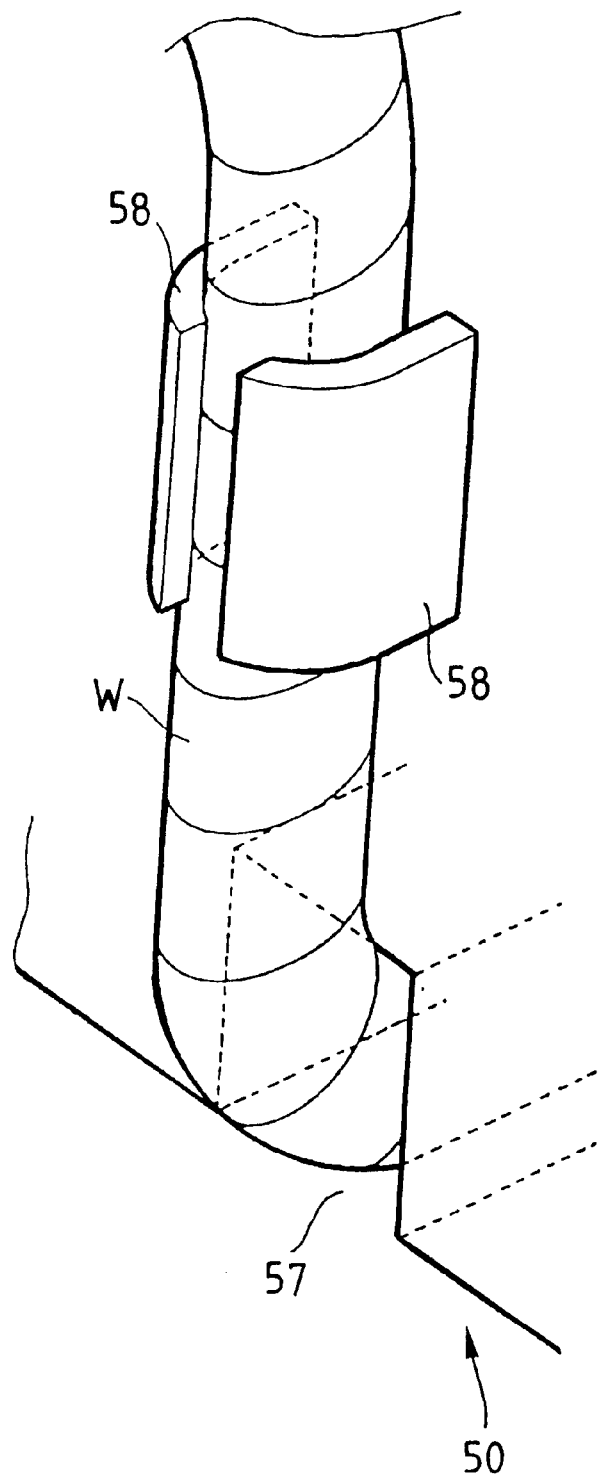
FIG. 11 is a perspective view showing clamping portions formed on the rear surface of the console box.

Electric wire terminals of a wire harness W are connected to respective terminals of the vehicle-side connector 38 from below. When the wire harness W is fitted into the U-groove 57, the wire harness W is led to the rear of the console box 50 and finally connected to electric equipment parts of the vehicle body, such as a battery 12, etc. Further, a pair of left and right clamping portions 58 as shown in FIG. 11 are formed on the rear end surface of the console box 50 so that the wire harness W is clamped and fixed toward the box side by the clamping portions 58.

Further, a harness takeup means 60 for taking-up the middle portion of the wire harness W is provided under the lower surface of the ceiling wall of the box cover 17 so that the slack of the wire harness W is restricted by the taking-up regardless of the position of the console box 50.

Figure 12:
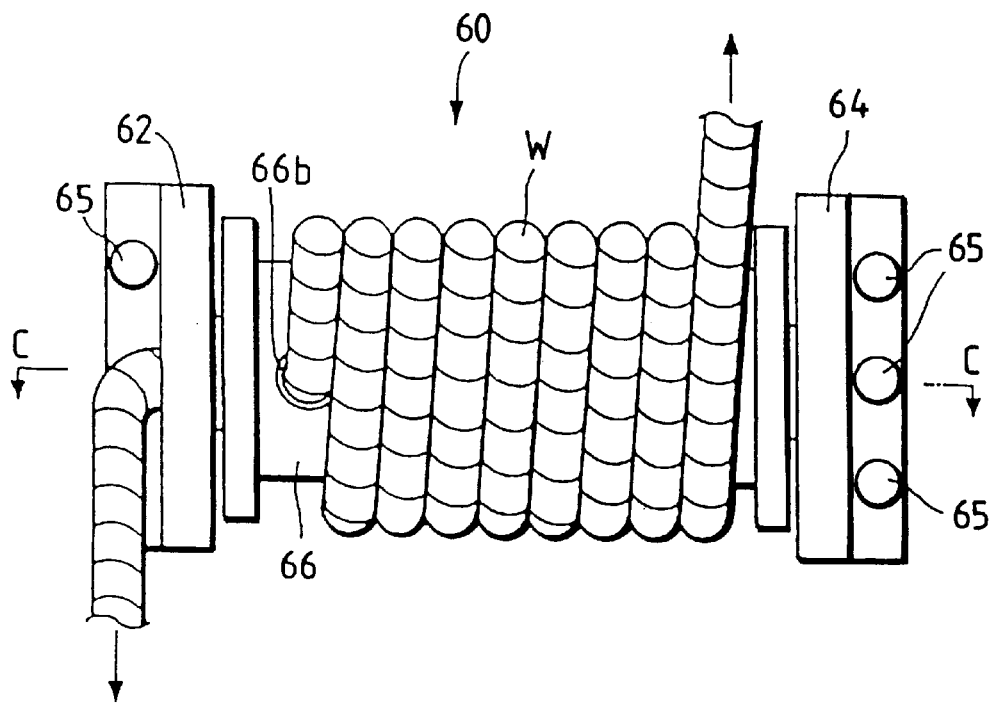
FIG. 12 is a bottom view showing a harness takeup device for taking-up a wire harness drawn out from the console box.
Figure 13:
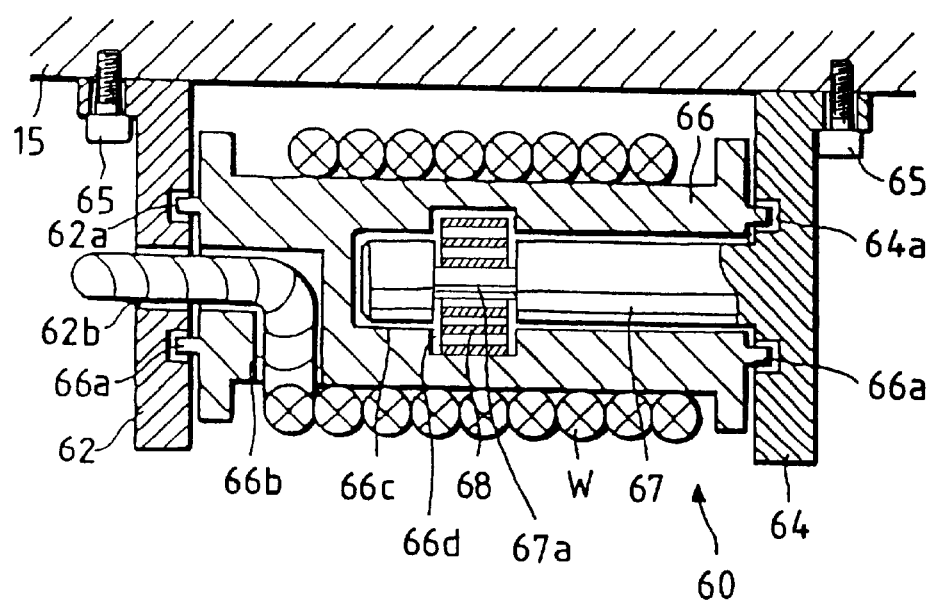
FIG. 13 is a sectional view taken along the line C—C in FIG. 12.

As shown in FIGS. 12 and 13, the harness takeup means 60 has a pair of left and right drum support members 62 and 64. The pair of drum support members 62 and 64 are fixed to the ceiling wall of the box cover 17 by bolts 65. Further, a takeup drum 66 is rotatably supported between the pair of drum support members 62 and 64. In detail, ring grooves 62*a* and 64*a* are provided in the inner surfaces of the drum support members 62 and 64 respectively and protrusions 66*a* are provided on the opposite end surfaces of the takeup drum 66 so that the protrusions 66*a* are fitted into the ring grooves 62*a* and 64*a* respectively. Accordingly, the takeup drum 66 as a whole can rotate around a horizontal axis while the protrusions 66*a* rotate along the ring grooves 62*a* and 64*a* respectively.

A harness insertion hole 62*b* is provided in the center portion (corresponding to the center of the circle of the ring groove 62*a*) of one drum support member 62 so as to penetrate the drum support member 62. A harness insertion hole 66*b* is formed in the takeup drum 66 so as to be disposed in a range from the center position of the end surface opposite to the harness insertion hole 62*b* to the outer circumference of the drum. Further, the wire harness W drawn out from the battery 12 side is led to the outer circumferential surface of the takeup drum 66 through the harness insertion holes 62*b* and 66*b*. When the wire harness W is wound on the outer circumferential surface by a plurality of turns, the wire harness W is led to the console box 50 side.

A shaft portion 67 is extended linearly toward the drum support member 62 from the center portion (corresponding to the center of the circle of the ring groove 64*a*) of the other drum support member 64. A small-diameter portion 67*a*, having a diameter smaller than that of other portions, is formed in the middle portion of the shaft portion 67. However, a linear hole 66*c* is provided in the center portion of the takeup drum 66 so that the shaft portion 67 can be inserted in the hole 66*c*. A large-diameter portion 66*d* having a diameter larger than that of the other portions is formed in the middle portion (corresponding to the small-diameter portion 67*a*) of the hole 66*c*. Further, a spiral spring (urging means) 68 is provided between the inner circumferential surface of the large-diameter portion 66*d* and the outer circumferential surface of the small-diameter portion 67*a* so that the takeup drum 66 is always urged toward the harness taking-up direction (counterclockwise direction in FIG. 7) by the elastic force of the spiral spring 68.

In the structure as described above, when the electric equipment units 40A to 40C are not attached, the console box 50 can be pushed into the box cover 17 so as to reach the housing position as shown in FIG. 7 so that a wide space can be secured in the cabin 16, for example, to enable a passenger to walk between the driver's seat 18 and the assistant-driver's seat 19.

However, when any one of the electric equipment units 40A to 40C is to be attached to the console box 50, a finger, or the line, is inserted in the knob space 52, and the console box 50 is slid to the front directly so as to be drawn out to the use position shown in FIG. 14. While a desired detachable unit (for example, the detachable unit 40A in FIG. 14) is inserted in the unit insertion space 51 of the console box 50 from above, and the projecting strips 41*a* on the bottom portion of the detachable unit are inserted in the through-holes 54 in the bottom wall of the unit insertion space 51, the detachable connector 4C and the vehicle-side connector 38 are connected to each other. Thus, the attachment of the detachable unit 40A can be completed (the state of FIG. 14).

Although this structure has been described above with regard to the situation where the console box 50 as a unit insertion member is arranged so as to be movable back and forth between the housing position and the use position, the invention may also be applied to the situation where the same unit insertion member as the console box 50 is set in the cabin so as to be immovable.

A second aspect for carrying out the invention is shown in FIG. 15. Here, the vehicle-side connector 38 is only set in a specific single place (beside the driver's seat 18 in FIG. 15) and other constituent parts in this aspect are the same as those in the first aspect.

Also in this aspect, the variety of the electronic systems can be enhanced regardless of the small setting space, and an excellent effect can be obtained if various kinds of detachable units (for example, detachable units 40A to 40C as described above) can be selectively connected to the single vehicle-side connector 38. Obviously, the setting position of the vehicle-side connector 38 in this aspect is not limited to the side of the driver's seat 18, but may be freely set in an arbitrary position in the cabin 16. Also in this aspect, the specific structure of the detachable unit 40A, or the like, and the structure of attachment/detachment thereof to the vehicle may be set freely. For example, a structure shown in FIGS. 6 through 14 can be used preferably.

As described above, according to the invention, a structure of electric equipment for a vehicle is provided, wherein vehicle-side connectors are disposed in a plurality of places in a vehicle. Constituent elements of an electronic system used in the vehicle are partly combined with a detachable connector capable of being connected to any one of the vehicle-side connectors to thereby form a detachable unit. Electronic system constituent elements in the detachable unit and electronic system constituent elements provided in the vehicle body are connected to each other to construct the electronic system when the detachable connection is connected to any one of the vehicle-side connectors. Accordingly, an electronic system having constituent elements in positions where the constituent elements are easily operated can be constructed easily by simply connecting a detachable connector to a suitable vehicle-side connector.

Particularly, preparing various kinds of detachable units having constituent elements of different electronic systems provides the advantage of increasing the variety of electronic systems which can be used in the vehicle while limiting the number of electronic system constituent elements set in the vehicle body to a minimum.

Further, a multiplex signal processing device may be provided in the detachable unit so that multiplex communications can be made between the electronic system constituent elements in the detachable unit and the electronic system constituent elements in the vehicle body through the multiplex signal processing device. In this case, complex information exchange can be made by a simple wiring structure. Accordingly, advantageously, the size of the detachable unit per se can be reduced and the structure thereof can be simplified.

The structure, in which the electronic system constituent elements in the detachable unit are supplied with electric power from a source of electricity provided in the vehicle when the detachable connector is connected to any one of the vehicle-side connectors, provides the advantage that the source of electricity at the vehicle body can be used effectively to obviate a source of electricity at the detachable unit.

The structure, in which the electronic system constituent elements in the detachable unit and the detachable connector are received in a unit housing, and a housing insertion portion is provided in each of the places where the vehicle-side connectors are disposed in the vehicle so that the unit housing can be inserted in the housing insertion portion so that the detachable connector and the vehicle-side connector are connected to each other by insertion of the unit housing into the housing insertion portion, provides the advantage that not only can the connectors be connected to each other easily, but also the detachable unit can remain connected in the cabin stably.

Further, according to the invention, a vehicle-side connector is disposed in a specific place in a vehicle. Constituent elements of an electronic system used in this vehicle are partly combined with detachable connectors capable of being connected to the vehicle-side connector to thereby form various kinds of detachable units having different electronic system constituent elements. Electronic system constituent elements in the detachable unit and electronic system constituent elements provided in the vehicle body are connected to each other to construct one of the electronic systems when the detachable connector in any one of the detachable units and the vehicle-side connector are connected to each other. Accordingly, the advantage is provided that variety in electronic systems which can be used in the vehicle can be enhanced, while the number of electronic system constituent elements set in the vehicle body side is limited to the minimum.

Further, in this structure, a multiplex signal processing device may be provided in the detachable unit so that the electronic system constituent elements in the detachable unit are multiplex-communicated with the electronic system constituent elements in the vehicle body through the multiplex signal processing device. Alternatively, the detachable unit may comprise a housing receiving therein: a detachable connector capable of being connected to a vehicle-side connector disposed in the vehicle; part of constituent elements of electronic systems used in the vehicle; and a multiplex signal processing device for performing multiplex communications between electronic system constituent elements in the detachable unit and electronic system constituent elements in the vehicle body when the detachable connector and the vehicle-side connector are connected to each other. This case provides the advantage that complex information exchange can be made be made by a simple wiring structure.

What is claimed is:

1. An electric equipment apparatus for a vehicle, comprising:
   a signal line;
   an electronic system used in the vehicle including at least one vehicle-side constituent element and at least one detachable unit-side constituent element;
   multiple vehicle-side connectors disposed in a plurality of locations in the vehicle, each of the multiple vehicle-side connectors being connected to the signal line; and
   at least one detachable unit that includes the at least one detachable unit-side constituent element of the electronic system combined with a detachable connector capable of being connected to any one of the vehicle-side connectors;
   wherein the signal line distributes communications signals between the vehicle-side constituent element and each one of the multiple vehicle-side connectors; and
   wherein the at least one detachable unit-side constituent element of the electronic system and the at least one vehicle-side constituent element of the electronic system are connected to each other through the signal line to form the electronic system when the at least one detachable connector is connected to any one of the vehicle-side connectors.

2. The electric equipment apparatus for a vehicle according to claim 1, wherein the at least one detachable unit includes multiple detachable units, each of the multiple detachable units having a different detachable unit-side constituent element of a different electronic system.

3. The electric equipment apparatus for a vehicle according to claim 1, further including a power line provided in the vehicle, wherein each of the multiple vehicle-side connectors is connected to the power line and the at least one detachable unit-side constituent element in the detachable unit is supplied with electric power from the power line when the detachable connector is connected to any one of the vehicle-side connectors.

4. The electric equipment apparatus for a vehicle according to claim 1, further including a multiplex signal processing device provided in the at least one detachable unit so that the at least one detachable unit-side constituent element of the electronic system is multiplex-communicated with the at least one vehicle-side constituent element of the electronic system through the multiplex signal processing device.

5. The electric equipment apparatus for a vehicle according to claim 1, further including a unit housing that receives the at least one detachable unit-side constituent element of the electronic system and the at least one detachable connector, and a housing insertion portion provided at each location where the vehicle-side connectors are disposed in the vehicle so that the unit housing can be inserted in the housing insertion portion so that the detachable connector and any one of the vehicle-side connectors are connected to each other by insertion of the unit housing into the housing insertion portion.

6. An electric equipment apparatus for a vehicle, comprising:
   a signal line;
   an electronic system used in the vehicle including at least one vehicle-side constituent element and at least one detachable unit-side constituent element;
   a vehicle-side connector disposed in a specific place in the vehicle, the vehicle-side connector being connected to the signal line; and
   multiple types of detachable units, each detachable unit including the at least one detachable unit-side constituent element of the electronic system combined with at least one detachable connector capable of being connected to the vehicle-side connector;

wherein the signal line transmits communications signals between the vehicle-side constituent element and one of the multiple types of detachable units that is connected to the vehicle-side connector; and wherein the at least one detachable unit-side constituent element of the electronic system and the at least one vehicle-side constituent element of the electronic system are connected to each other through the signal line to form the electronic system when the at least one detachable connector of one of the multiple types of detachable units and the vehicle-side connector are connected to each other.

7. The electric equipment apparatus for a vehicle according to claim 6, further including a multiplex signal processing device provided in the at least one detachable unit so that the at least one detachable unit-side constituent element of the electronic system is multiplex-communicated with the at least one vehicle-side constituent element of the electronic system through the multiplex signal processing device.

8. A detachable unit for vehicle electric equipment, comprising:
   at least one vehicle-side constituent element;
   at least one detachable unit-side constituent element;
   a vehicle-side connector disposed in the vehicle, the vehicle-side connector being connected to a signal line; and
   a detachable housing receiving therein:
      a detachable connector capable of being connected to the vehicle-side connector,
      the at least one detachable unit-side constituent element, and
      a multiplex signal processing device that performs multiplex communications through the signal line between the at least one detachable unit-side constituent element and the at least one vehicle-side constituent element when the detachable connector and the vehicle-side connector are connected to each other;
   wherein the signal line transmits communications signals between the vehicle-side constituent element and one of the detachable unit-side constituent element which is connected to the vehicle-side connector.

9. The electric equipment apparatus for a vehicle according to claim 1, further including a vehicle-side housing, the vehicle-side housing comprising at least one of said multiple vehicle-side connectors and the vehicle-side housing being capable of supporting said at least one detachable unit.

10. The electric equipment apparatus for a vehicle according to claim 9, wherein the vehicle-side housing is movable between at least two positions.

11. The electric equipment apparatus for a vehicle according to claim 9, wherein the detachable connector is automatically connected to the vehicle-side connector of the vehicle-side housing when the at least one detachable unit is supported by the vehicle-side housing.

12. The electric equipment apparatus for a vehicle according to claim 6, further including a vehicle-side housing, the vehicle-side housing comprising said vehicle-side connector and the vehicle-side housing being capable of supporting at least one of said detachable units.

13. The electric equipment apparatus for a vehicle according to claim 12, wherein the vehicle-side housing is movable between at least two positions.

14. The electric equipment apparatus for a vehicle according to claim 12, wherein the detachable connector is automatically connected to the vehicle-side connector of the vehicle-side housing when the at least one detachable unit is supported by the vehicle-side housing.

15. An electric equipment apparatus for a vehicle, comprising:
   a signal line;
   an electronic system used in the vehicle including at least one vehicle-side constituent element and at least one detachable unit-side constituent element;
   multiple vehicle-side connectors disposed in a plurality of locations in the vehicle, each of the multiple vehicle-side connectors being connected to the signal line; and
   at least one detachable unit that includes the at least one detachable unit-side constituent element of the electronic system combined with a detachable connector capable of being connected to any one of the vehicle-side connectors;
   wherein the signal line distributes communications signals between the vehicle-side constituent element and each one of the multiple vehicle-side connectors; and
   wherein the at least one detachable unit-side constituent element of the electronic system and the at least one vehicle-side constituent element of the electronic system are capable of communicating with each other through the signal line to form the electronic system when the at least one detachable connector is connected to any one of the vehicle-side connectors.

16. An electric equipment apparatus for a vehicle, comprising:
   a signal line;
   an electronic system used in the vehicle including at least one vehicle-side constituent element and at least one detachable unit-side constituent element;
   multiple vehicle-side connectors disposed in a plurality of locations in the vehicle, each of the multiple vehicle-side connectors being connected to the signal line; and
   at least one detachable unit that includes the at least one detachable unit-side constituent element of the electronic system combined with a detachable connector capable of being connected to any one of the vehicle-side connectors;
   wherein the signal line distributes communications signals between the vehicle-side constituent element and each one of the multiple vehicle-side connectors; and
   wherein the at least one detachable unit-side constituent element of the electronic system controls the at least one vehicle-side constituent element of the electronic system through the signal line when the at least one detachable connector is connected to any one of the vehicle-side connectors.

17. An electric equipment apparatus for a vehicle, comprising:
   a power line;
   a signal line;
   an electronic system used in the vehicle including at least one vehicle-side constituent element and at least one detachable unit-side constituent element;
   multiple vehicle-side connectors disposed in a plurality of locations in the vehicle, each of the multiple vehicle-side connectors being connected to the power line and to the signal line; and
   at least one detachable unit that includes the at least one detachable unit-side constituent element of the electronic system combined with a detachable connector capable of being connected to any one of the vehicle-side connectors;

wherein the signal line distributes communications signals between the vehicle-side constituent element and each one of the multiple vehicle-side connectors; and wherein the at least one detachable unit-side constituent element of the electronic system is powered through the power line when the at least one detachable connector is connected to any one of the vehicle-side connectors; and wherein the at least one detachable unit-side constituent element of the electronic system and the at least one vehicle-side constituent element of the electronic system are connected to each other through the signal line to form the electronic system when the at least one detachable connector is connected to any one of the vehicle-side connectors.

18. An electric equipment apparatus for a vehicle, comprising:

a signal line;

at least one vehicle-side constituent element of an electronic system used in the vehicle;

multiple vehicle-side connectors disposed in a plurality of locations in the vehicle, each of the multiple vehicle-side connectors being connected to the signal line, each of the multiple vehicle-side connectors being capable of being connected to a detachable connector of at least one detachable unit that includes at least one detachable unit-side constituent element of the electronic system combined;

wherein the signal line distributes communications signals between the vehicle-side constituent element and each one of the multiple vehicle-side connectors; and wherein the vehicle-side constituent element of the electronic system is capable of forming the electronic system with the at least one detachable unit-side constituent element of the electronic system when the at least one detachable connector is connected to any one of the vehicle-side connectors.

19. A detachable unit of an electronic system, comprising:

a detachable unit-side constituent element of the electronic system;

a detachable connector capable of being connected to multiple vehicle-side connectors disposed in a plurality of locations in a vehicle, the vehicle-side connectors being connected to a vehicle-side constituent element of the electronic system through a signal line; wherein the detachable unit-side constituent element of the electronic system is capable of forming the electronic system with the vehicle-side constituent element of the electronic system when the detachable connector is connected to any one of the vehicle-side connectors.

* * * * *